United States Patent [19]

Teramachi

[11] Patent Number: 4,614,382
[45] Date of Patent: Sep. 30, 1986

[54] STRAIGHT SLIDING ROLLER BEARING

[76] Inventor: Hiroshi Teramachi, 34-8, Higashitamagawa 2-chome, Setagaya-ku, Tokyo, Japan

[21] Appl. No.: 776,265

[22] Filed: Sep. 16, 1985

[30] Foreign Application Priority Data

Sep. 21, 1984 [JP] Japan ............................... 59-196536
Oct. 16, 1984 [JP] Japan ............................... 59-215215

[51] Int. Cl.[4] .......................................... F16C 29/06
[52] U.S. Cl. ..................................................... 384/45
[58] Field of Search ............... 308/6 C, 6 R, 3 A, 3 R

[56] References Cited

U.S. PATENT DOCUMENTS

| | | | |
|---|---|---|---|
| 4,475,776 | 10/1984 | Teramachi | 308/6.6 |
| 4,496,196 | 1/1985 | Teramachi | 308/6.6 |
| 4,518,200 | 5/1985 | Teramachi | 308/6 C |
| 4,527,841 | 7/1985 | Teramachi | 308/6 C |
| 4,527,841 | 7/1985 | Teramachi | 308/6.6 |
| 4,527,842 | 7/1985 | Teramachi | 308/6 C |
| 4,553,794 | 11/1985 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

Herein disclosed is a straight sliding roller bearing which comprises: a pair of sliding table halves each including an upper load bearing portion and a lower load bearing portion and having a loaded groove and an unloaded portion at the leading end of each of the load bearing portions; an elastically deformable roof mounted over the upper faces of said sliding table halves; a pair of roller guides attached respectively to the leading ends of the load bearing portions of the respective ones of the sliding table halves; rails having their upper portions fitted, while being held at a predetermined spacing, in the recesses, which are formed in both of said sliding table halves and in the roof, and having rolling faces; and a number of rollers adapted to roll on the endless roller faces of the respective ones of the said sliding table halves. In a pre-pressure adjusting when said roller bearing is to be attached to a carriage made movable along the rails, the roof is made elastically deformable so that the gap between the sliding table halves and the rails can be adjusted.

7 Claims, 34 Drawing Figures

STRAIGHT SLIDING ROLLER BEARING

FIELD OF THE INVENTION AND RELATED ART STATEMENT

The present invention relates to a straight sliding roller bearing for guiding straight a sliding carriage in the slide of a machine tool, e.g., an NC machine or an industrial robot.

The straight sliding bearing of the above-specified kind according to the prior art is usually constructed to comprise: a sliding table formed to have a section of generally inverted C-shape having a recess in its lower side; rails having its upper portions fitted while held at a predetermined spacing in the recess of said sliding table; and balls or rollers adapted to roll on endless races formed on said sliding table, whereby said straight sliding bearing guides the straight reciprocal movements along the rails while bearing the vertical and transverse loads acting upon the sliding table by means of those balls or rollers.

This straight sliding bearing is required to select a proper gap in accordance with its application such as in case a shocking load resulting from the moment of inertia when the sliding table turns or overhangs so that a high rigidity is demanded, in case a high accuracy is demanded for positioning or repeating operations, or in case a high accuracy under a light load is so demanded as in a meter that the bearing has to move smoothly. This requirement is generally satisfied by applying a pre-pressure to the bearing.

In the prior art, therefore, as the method of adjusting the pre-pressure in the straight sliding bearing, there has been usually adopted means for selectively fitting the balls of the sliding table, for adjusting the depth of cut of the rolling grooves of the sliding table, or for adjusting the gap between the sliding table and the rails by means of adjusting bolts which are disposed in the housing of the sliding table.

However, it is remarkably troublesome work to selectively fit the balls or to adjust the depth of cut of the rolling grooves. After the pre-pressure has been adjusted by once selectively fitting the balls or adjusting the depth of cut of the rolling grooves, moreover, it is difficult to make a readjustment. As a result, there arises a problem that once the level of the pre-pressure drops as the rolling grooves or the balls wear it becomes difficult to apply the proper pre-pressure any more.

Like the cases of the above-specified means for selectively fitting the balls and for adjusting the depth of cut of the rolling grooves, on the other hand, in the means for adjusting the gap between the sliding table and the rails by the adjusting bolts disposed in the housing of the sliding table, it is necessary to prevent the horizontal portion of the sliding table when the pre-pressure is adjusted by means of the adjusting bolts. This makes it necessary to thicken the sliding table itself, especially, the horizontal portion of the former. As a result, the position of the center of gravity is raised, when the sliding table is assembled with the carriage, so that the point where the load is applied is necessarily raised in case a horizontal load is applied, to cause a problem that the momental load acting upon the ball rolling faces between the sliding table and the rails of the bearing is increased.

OBJECTS AND SUMMARY OF THE INVENTION

It is, therefore, an object of the present invention to provide a straight sliding roller bearing which can not only be adjusted to apply the pre-pressure or not in accordance with the applications but also simply adjust the level of the pre-pressure.

Another object of the present invention is to provide a straight sliding roller bearing which can reduce the height of the sliding table to drop the point, in which the load in a horizontal direction is applied to a carriage attached to the upper face of the sliding table, so that the momental load acting upon the roller rolling faces can be reduced to improve the stability.

A further object of the present invention is to provide a straight sliding roller bearing which can be easily attached to the carriage.

According to the present invention, more specifically, there is provided a straight sliding roller bearing comprising: a pair of sliding table halves each including an upper load bearing portion and a lower load bearing portion and formed in the inner side of the leading end of each of said load bearing portions with loaded grooves, which have rolling faces forming the loaded areas of endless roller races along their axial directions, and in the outer side of the same with unloaded portions, which form endless roller races along their axial directions in a manner to correspond to said loaded grooves, such that at least one of said rolling faces is so inclined as to bear the transverse load; a roof mounted over the upper faces of said sliding table halves, which are opposed at a predetermined spacing to each other, and made elastically deformable between said paired sliding table halves; two pairs of roller guides attached respectively to the leading ends of the respective load bearing portions of said respective sliding table halves and associated either with said loaded grooves or with said loaded grooves and said unloaded portions to form said endless roller races; rails having their upper portions fitted at a predetermined spacing from each other in the recesses, which are formed in said sliding table halves and said roof, and having rolling faces facing the rolling faces of said loaded grooves which are formed in the load bearing portions of said respective sliding table halves; and a multiplicity of rollers made rollable on the respective endless roller races, which are formed respectively on the loaded portions of said respective sliding table halves, for bearing loads between the rolling faces at the sides of said sliding table halves and the rolling faces at the sides of said rails, whereby, in a pre-pressure adjusting when said roller bearing is to be attached to a carriage made movable along said rails, the gap between said sliding table halves and said rails can be adjusted by applying a transverse load to one of said sliding table halves to elastically deform said roof.

In the present invention, each of the sliding table halves may be so shaped as to have an upper load bearing portion and a lower load bearing portion, at least one of which is formed with a sloped rolling face capable of bearing a transverse load. For example, each of said sliding table halves has a sloped upper portion and a sloped lower portion, which intersect each other on an extension extending from one side of a horizontal mounting portion, and formed in the lower side of the leading end of said sloped upper portion and in the inner side of the lower end of said sloped lower portion, respectively, with the loaded grooves, which have rolling faces having a sloping angle of 45 degrees and forming the loaded regions of said endless roller races along their axial directions, and on the upper side of the leading end of said sloped upper portion and on the outer side of the lower end of said sloped lower portion, respectively, with the unloaded portions which form said endless roller races along their axial directions in a manner to correspond to said loaded grooves. Alternatively, each of said sliding table halves is formed to have a generally L-shaped section having a horizontal portion and a depending portion, which depends from one end of said horizontal portion, and formed in the lower side of the leading end of said horizontal portion with the loaded groove, which have a horizontal rolling face forming the loaded region of the corresponding one of said endless roller races along its axial direction, in the inner side of the lower end of said depending portion with the loaded groove having a sloping angle of 45 degrees and forming the loaded region of the corresponding one of said endless roller races along its axis, and on the upper side of the leading end of said horizontal portion and the outer side of the lower end of said depending portion, respectively, with the unloaded portions which form said endless roller races along their axial directions in a manner to correspond to said loaded grooves.

In the present invention, moreover, the roof to be mounted over the paired sliding table halves may be made of an elastically deformable plate member, but may preferably be made relatively thin for reducing the height of the sliding table which is assembled by the paired sliding table halves and the roof and may preferably be formed at its central portion with a thinned or bent portion for facilitating the elastic deformation.

Still moreover, the respective rollers rolling on the endless roller races may be either cylindrical rollers or spherical rollers.

According to the straight sliding roller bearing of the present invention, in the pre-pressure adjustment when the sliding table is assembled with the carriage made movable along the rails, the roof is elastically deformed to adjust the gap between the sliding table and the rails by temporarily assembling the sliding table, which is constructed of the paired sliding table halves and the roof, with the carriage by means of fastening bolts and by adjusting the pre-pressure by means of adjusting bolts. Moreover, the uniform pre-pressure can be applied to the rollers because these rollers are held in the vertical and transverse directions of the rails. At this time, still moreover, adjustments can be made to or not to apply the pre-pressure in accordance with the applications. In addition, the level of the pre-pressure can be adjusted with ease.

Since the assembly of the sliding table is made by making use of the rigidity of the carriage, furthermore, the roof can be made so thin that the height of the sliding table can be reduced. In addition, the height of the bearing in its entirety can be reduced by holding those respective sliding table halves engaging with the two sides of the rails so that the center of gravity of the carriage can be dropped to improve the stability.

Furthermore, the paired sliding table halves carrying the numerous rollers composing the bearing are assembled in advance between the two sliding table halves by means of the elastically deformable roof, and the gap between the sliding table halves can be slightly enlarged, when the sliding table is temporarily assembled with the carriage, so that the attachment of the sliding table can be remarkably facilitated.

Since the present invention uses the rollers having relatively large contact areas, furthermore, it can provide a bearing which can endure a higher load than the bearing using balls.

DETAILED DESCRIPTION OF THE PREFERRED EMBODIMENTS

Figure 1:
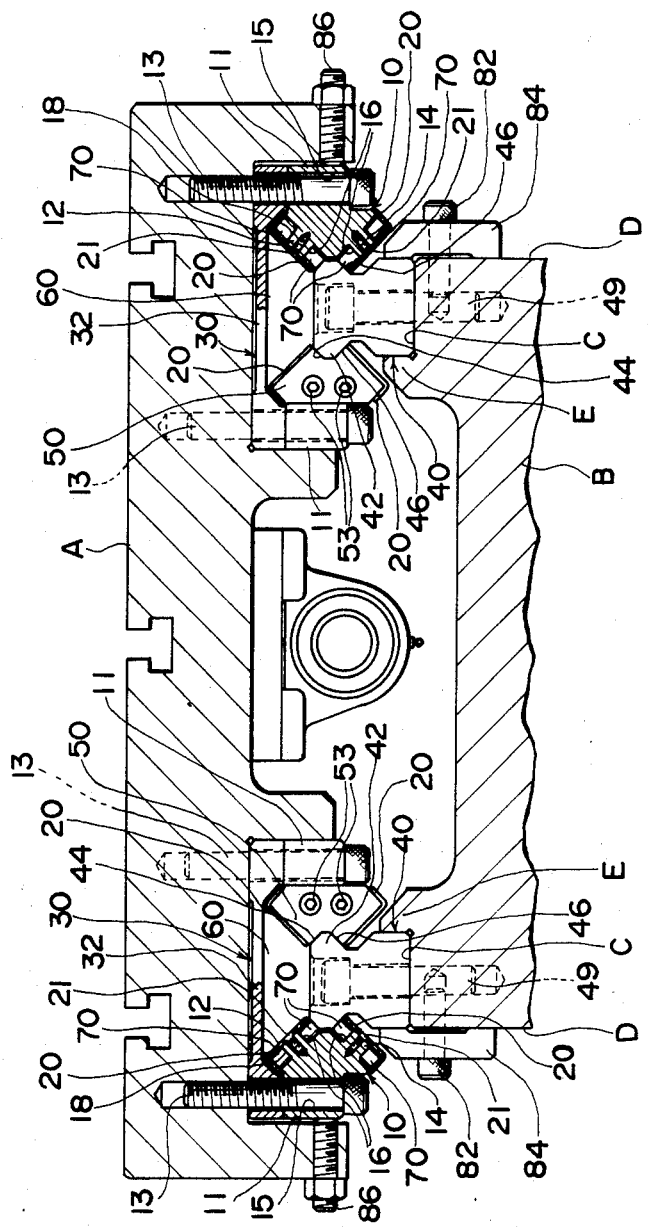
FIG. 1 is a sectional view showing the used state of a first embodiment of the straight sliding roller bearing according to the present invention.

The present invention will be described in detail in the following in connection with the embodiments thereof with reference to the accompanying drawings.

In FIGS. 1 to 21, there is shown a straight sliding roller bearing according to a first embodiment of the present invention. This straight sliding roller bearing of the first embodiment is constructed, as shown in FIGS. 1 and 2, majorly of: a pair of sliding table halves 10 having a generally triangular section and including a sloped upper portion 12 and a sloped lower portion 14 intersecting each other on their extensions as an upper load bearing portion and a lower load bearing portion; a pair of roller guides attached to the leading end of the sloped upper portion 12 and the lower end of the sloped lower portion 14 of each sliding table half 10; a roof 30 connecting the upper faces of the two sliding table halves 10 to form downward recesses 60 and made elastically deformable between the two sliding table halves 10; rails having their upper portions fitted while held at a predetermined spacing from each other in said recesses 60; and a number of rollers 70 rolling in the endless roller races, which are formed in said sloped upper portion 12 and said sloped lower portion 14, respectively, to bear the load applied between the sliding table halves 10 and the rails 40.

Figure 2:
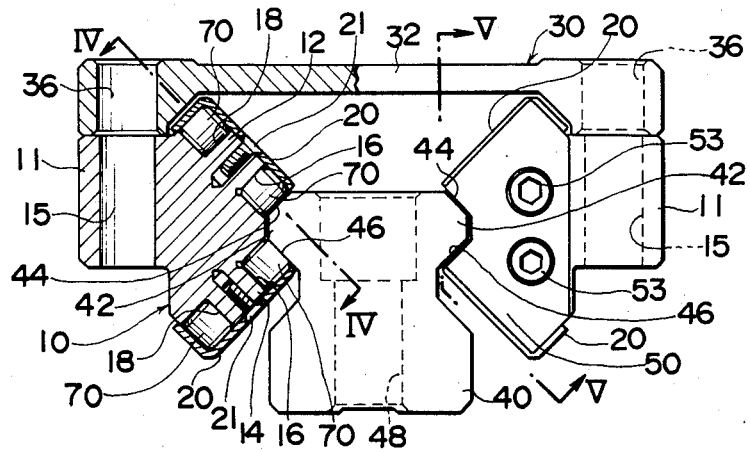
FIG. 2 is a partially sectional front elevation showing the straight sliding roller bearing according to the first embodiment.
Figure 3:
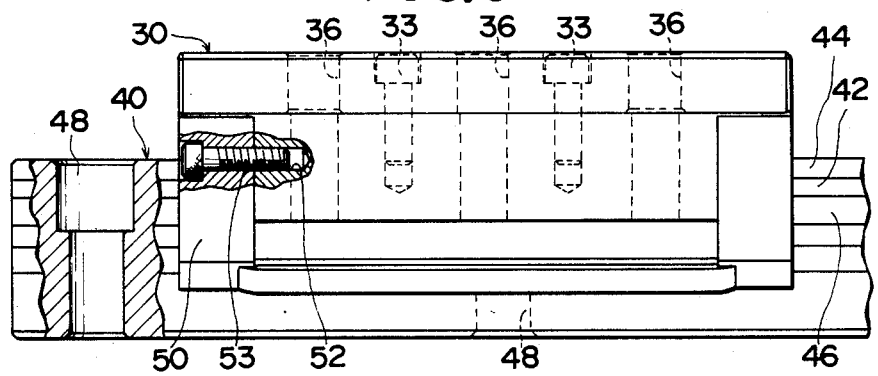
FIG. 3 is a partially sectional side elevation of FIG. 2.
Figure 4:
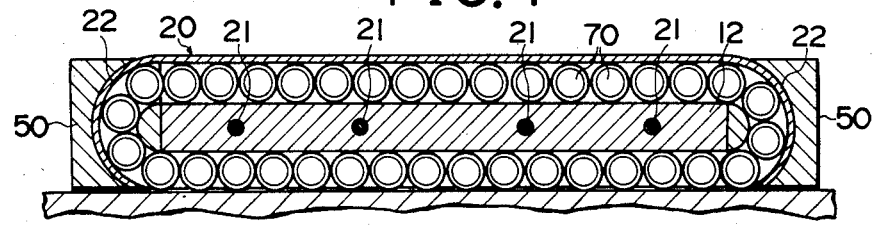
FIG. 4 is a section taken along line IV—IV of FIG. 2.
Figure 5:
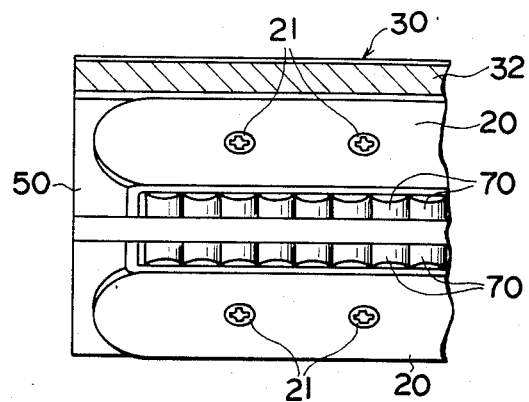
FIG. 5 is a section taken along line V—V of FIG. 2.
Figure 6:
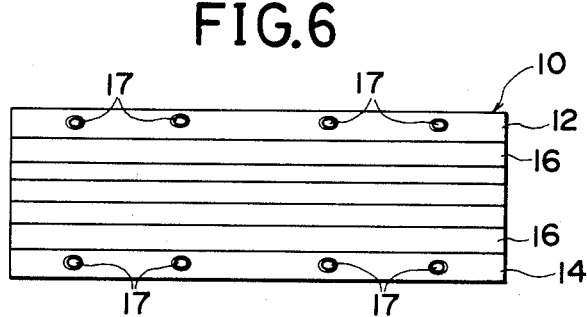
FIG. 6 is a front elevation of a sliding table half in the first embodiment.
Figure 7:
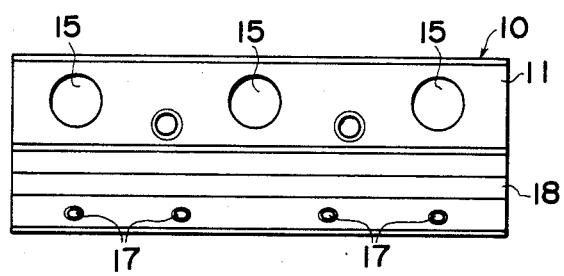
FIG. 7 is a top plan view of FIG. 6.
Figure 8:
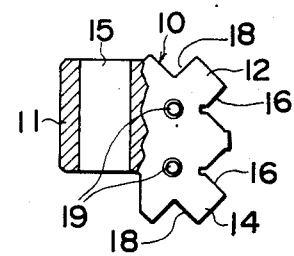
FIG. 8 is a partially sectional side elevation of FIG. 6.
Figure 9:
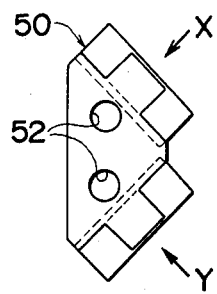
FIG. 9 is a front elevation showing a cover in the first embodiment.
Figure 10:
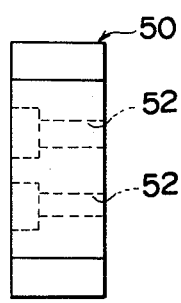
FIG. 10 is a side elevation of FIG. 9.
Figure 11:
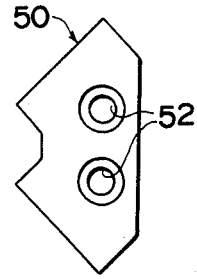
FIG. 11 is a back elevation of FIG. 9.

As shown in FIGS. 1 and 2, each of said sliding table halves 10 has said sloped upper and lower portions 12 and 14, which are respectively sloped at 45 degrees with respect to the mounting face of the sloped upper portion 12 on a carriage A while making 90 degrees in between, and is formed in the lower side of the leading end of the sloped upper portion 12 and in the inner side of the lower end portion of the sloped lower portion 14 with loaded grooves 16, which have rolling faces having a sloping angle of 45 degrees forming loaded regions of the endless roller races along their axial direction, and with an unloaded portion 18 form the corresponding one of the endless roller races in a manner to correspond to one of the loaded grooves 16 (as shown in FIGS. 6 to 8). Moreover, each sliding table half 10 has its upper portion formed at the side opposed to the sloped upper portion 12 with a horizontal mounting portion 11. This horizontal mounting portion 11 is formed with through holes 15 through which are fitted fastening bolts 13 for attaching the sliding table half 10 to the carriage A. Incidentally, the sliding table half 10 is formed at each of its longitudinal ends with threaded holes 19. In these threaded holes 19, there are fixed a cover 50, which is made of a synthetic resin, as shown in FIGS. 9 to 13, by means of fixing bolts 53 which extend through through holes 52 formed in said cover 50.

Figure 12:
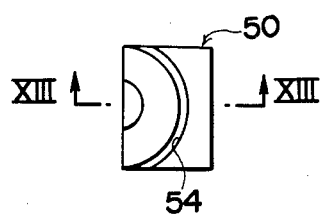
FIG. 12 is a view taken in the direction of arrow X or Y of FIG. 9.
Figure 13:
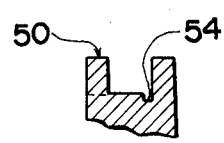
FIG. 13 is a section taken along line XIII—XIII of FIG. 12.
Figure 14:
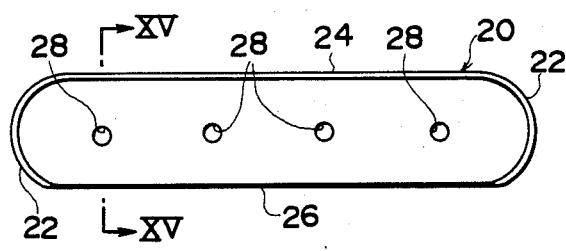
FIG. 14 is a front elevation showing a roller guide in the first embodiment.
Figure 15:
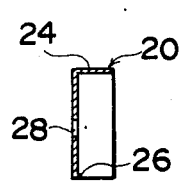
FIG. 15 is a section taken along line XV—XV of FIG. 14.

On the other hand, the aforementioned roller guides 20 are formed, as shown in FIGS. 14 and 15, by press-molding a metal sheet or injection-molding a hard synthetic resin and are formed at their both end portions with roller turning guide portions 22 having a generally semicircular shape and between those rolling turning guide portions 22 with holding portions 24 having a generally L-shaped section. Moreover, those holding portions 24 form the loaded regions and unloaded regions of the endless roller races together with the loaded grooves 16 and the grooved unloaded portions 18, which are formed at the leading end portions of the sloped upper portions 12 and the sloped lower portions 14 of the sliding table halves, and the aforementioned roller turning guide portions 22 guide cylindrical rollers exemplifying the rollers 70 between the loaded regions and unloaded regions of the endless roller races. Incidentally, the roller guides 20 are formed at the leading ends of their holding portions 24 with retaining pawls 26 for preventing the rollers 70 from coming out. Indicated at reference numeral 28 are through holes which are formed in the holding portions 24 of those roller guides 20. As a result, these roller guides 20 are attached to the sliding table halves 10 by means of screws 21 which are fastened to the respective mounting holes 17 of the sliding table halves 10 through those through holes 28. In this case, incidentally, the roller turning guide portions 22 of the roller guides 20 are fixedly fitted in generally semicircular mounting grooves 54 which are formed in the cover 50 (as shown in FIGS. 12 and 13).

Figure 16:
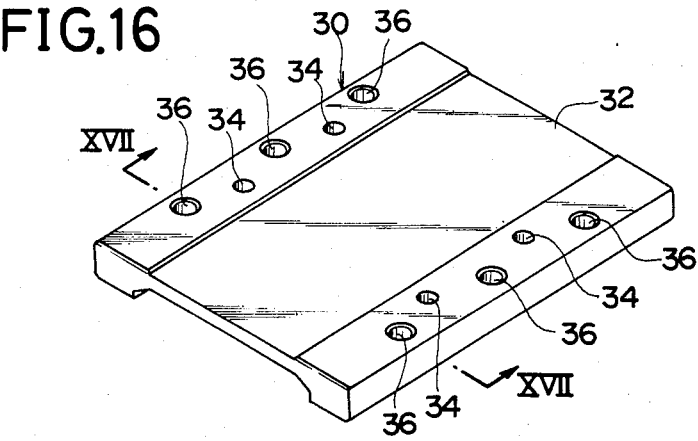
FIG. 16 is a perspective view showing a roof in the first embodiment.
Figure 17:
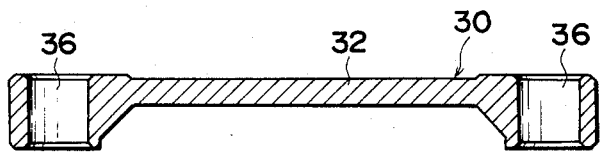
FIG. 17 is a section taken along line XVII—XVII of FIG. 16.
Figure 18:
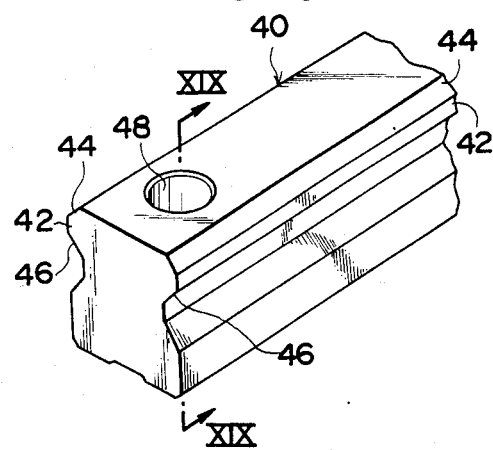
FIG. 18 is a perspective view showing a rail in the first embodiment.
Figure 19:
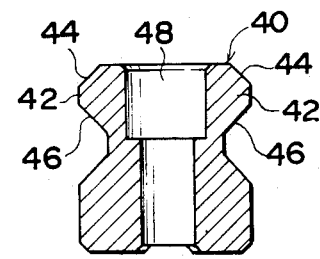
FIG. 19 is a section taken along line XIX—XIX of FIG. 18.

The aforementioned roof 30 is made of a generally rectangular steel plate or the like, as shown in FIGS. 16 and 17. The roof is formed at its central portion with a thinned portion 32 for allowing the elastic deformation (as shown in FIGS. 1 and 2) and in positions symmetric to that thinned portion 32 with two mounting holes 34, through which there extend fixing screws 33 for attaching the roof 30 to the sliding table halves 10, respectively, and three through holes 36 through which there extend the fastening bolts 13 for attaching the sliding table halves 10 to the carriage A. By fastening the fixing screws 33 extending through the mounting holes 34 to the threaded holes formed in the heads of the sliding table halves 10, moreover, the roof 30 is fixed to the sliding table halves 10, respectively.

Incidentally, the means for fixing the roof 30 to the sliding table halves 10 need not necessarily be exemplified by the fixing screws 33 but by the fixing means such as the welding means.

On the other hand, each of the aforementioned rails 40 is formed, as shown in FIGS. 1, 2, 18 and 19, at the two sides of its upper portion with trapezoidal lands 42 of about 90 degrees. Each of these lands 42 is formed on its upper side with an upper rolling face 44, which forms the loaded region together with the loaded groove 16 of the aforementioned sloped upper portion, and on its lower side with a lower rolling face 46 which forms the loaded region together with the loaded groove 16 of the aforementioned sloped lower portion 14. The rail 40 is also formed at its central portion with mounting through holes 48, which are suitably spaced in the longitudinal direction for fixing that rail 40 to a bed B of a machining apparatus, so that the rail 40 is fixed on the bed B by means of fixing bolts 49 which extend through those mounting through holes 48.

The straight sliding roller bearing thus constructed according to the first embodiment is assembled, as shown in FIG. 1, for use in the straight sliding table for guiding the straight reciprocal movements of various mechanical tools by fixing the rails 40 by means of the fixing bolts 49 to the reference faces C of the bed B to be attached to the machining apparatus, by clamping the rails 40 straight between holding members 84, which are attached to the side end faces D of the bed B by means of bolts 82, and the ridges E erected on the reference faces C, and by attaching the rigid carriage A by means of the fastening bolts 13 to the sliding table halves 10 and the roof 30, which construct together the bearing sliding along the rails 40. At this time, in order to apply a predetermined pre-pressure to the bearing, one sliding table half 10 is pushed toward the rails 40 by means of adjusting bolts 86 which are fastened from the side of the carriage A. Then, the roof 30 has its thinned portion elastically deformed between the two sliding table halves 10 so that the gap between the sliding table halves 10 and the rails 40 can be adjusted as a result of that elastic deformation in accordance with the intended use.

Figure 20:
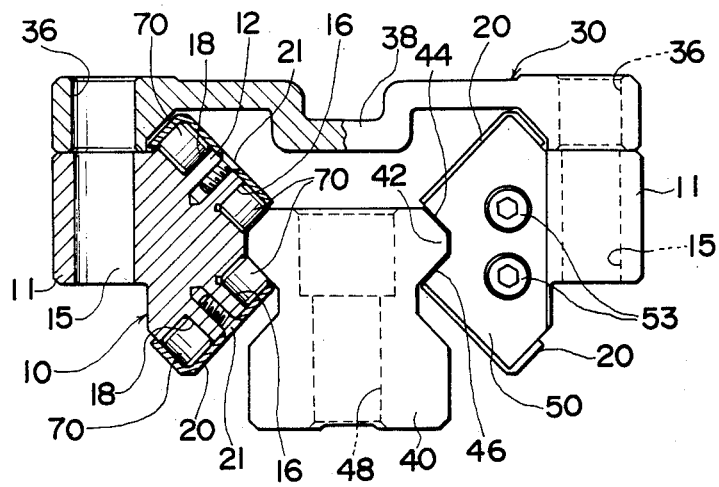
FIG. 20 is a front elevation similar to FIG. 2 but shows a modification of the roof in the first embodiment.

In the embodiment described above, incidentally, the roof 30 is formed at its central portion with the thinned portion 32 so that it may be elastically deformed when the pre-pressure is to be adjusted. However, the means for the elastic deformation should not necessarily be limited to the thinned portion 32, but similar effects can be attained even if the roof 30 is formed at its central portion with a bent portion 38 for ensuring the elastic deformation, as shown in FIG. 20.

Figure 21:
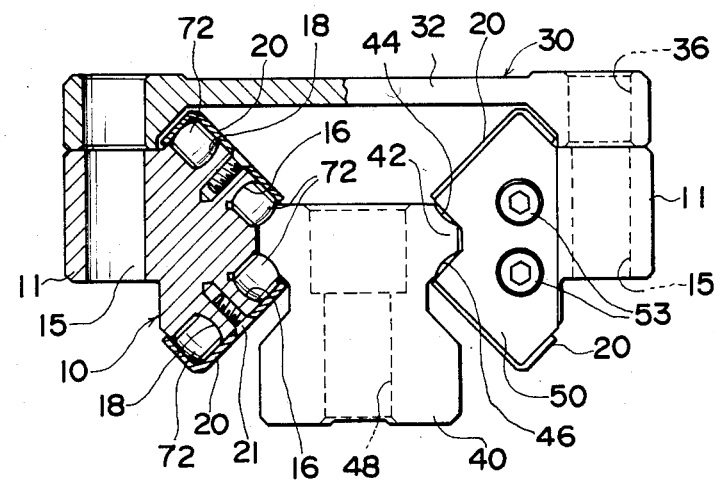
FIG. 21 is a front elevation similar to FIG. 2 but shows a modification of the rollers in the first embodiment.

In this first embodiment, moreover, the foregoing description has been directed to the case in which the rollers 70 are cylindrical rollers. As shown in FIG. 21, however, the cylindrical rollers can be replaced by spherical rollers 72. In this modification, the loaded grooves 16 of the aforementioned sliding table halves 10 and the rolling faces 44 and 46 of the rails 40 are formed into such arcuate shapes as have a radius of curvature made slightly larger than that of the spherical rollers 72. Thanks to the use of the spherical rollers 72, the automatic adjustment can be conducted, even in case the rails 40 are locally curved slightly, to avoid locally high loads.

Next, FIGS. 22 to 34 show the straight sliding roller bearing according to a second embodiment of the present invention.

In this second embodiment, as is different from the foregoing case of the first embodiment, each sliding table half 10 is formed into a generally L-shaped section having a horizontal portion 12a forming the upper load bearing portion and a depending portion 14a forming the lower load bearing portion. The horizontal portion 12a is formed in the lower side of its leading end with the loaded groove 16, which has a horizontal rolling face forming the loaded region of the endless roller race along its axial direction, whereas the depending portion 14a is formed in the inner side of its lower end with the loaded groove 16 which has a rolling face having a sloping angle of 45 degrees for forming the loaded region of the endless roller race along its axial direction. Moreover, the leading end of the aforementioned horizontal portion 12a and the lower end of the aforementioned depending portion 14a are formed with the unloaded portions 18 which form the endless roller races along their respective axial directions in a manner to correspond to the aforementioned loaded grooves 16. Still moreover, each of the sliding table halves 10 is formed with mounting holes 15a which are opened upward and in which are screwed the fastening bolts 13 for attaching each sliding table half 10 to the carriage A.

Furthermore, the roof 30 mounted over the upper faces of the respective sliding table halves 10 are made in its entirety of a generally rectangular thin steel plate to cover all over the sliding table halves 10 and each cover 50 and to protrude slightly from each cover 50. In the reciprocating movements for use, the cover 50 is protected by that roof 30 when it is hit at its stroke terminal by the stationary side of the machining apparatus.

Figure 22:
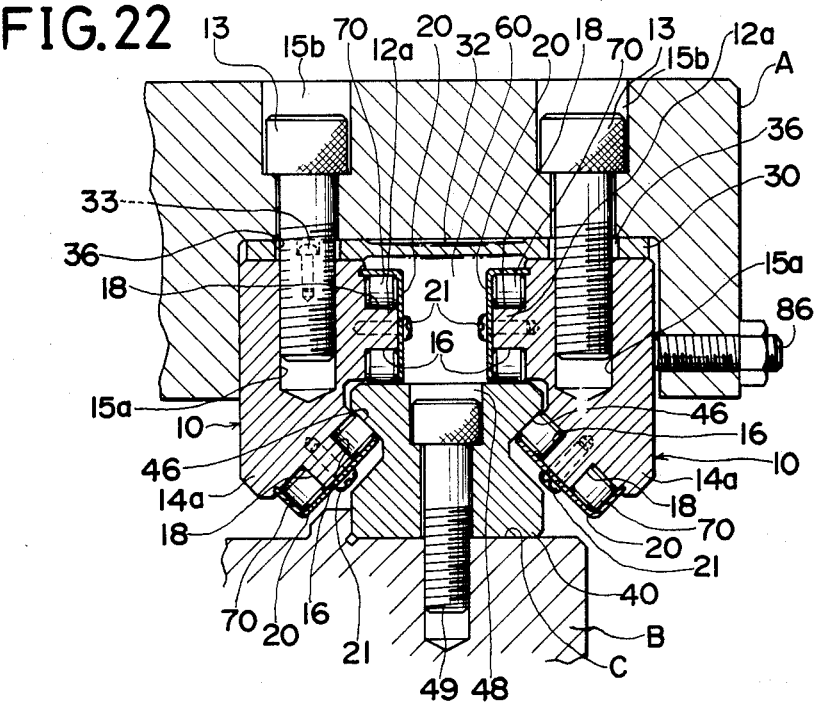
FIG. 22 is a partially sectional view showing the used state of a second embodiment of the straight sliding roller bearing according to the present invention.
Figure 23:
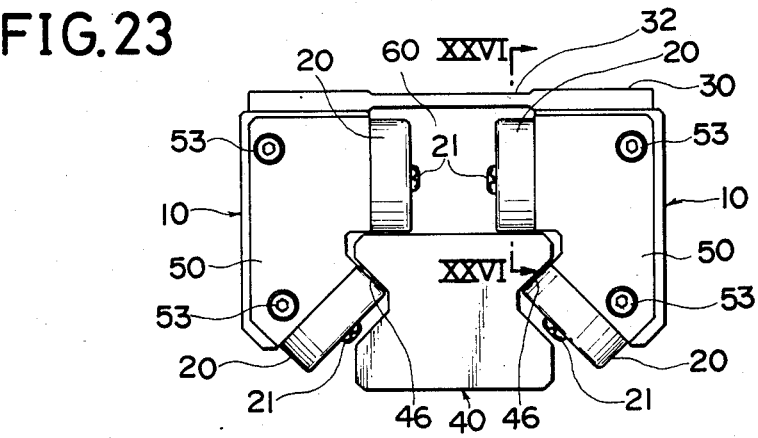
FIG. 23 is a front elevation showing the straight sliding roller bearing according to the second embodiment.
Figure 24:
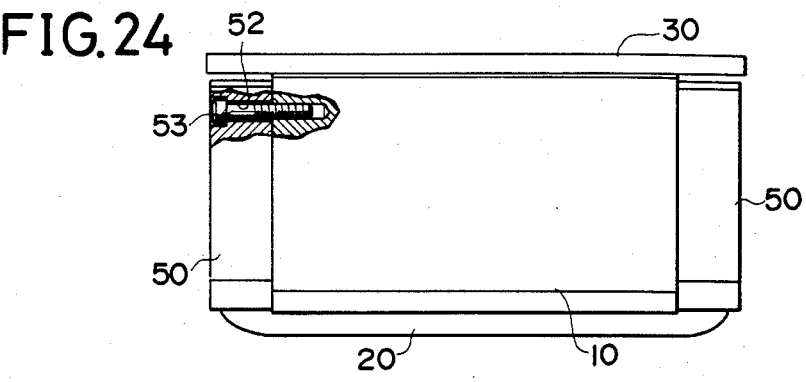
FIG. 24 is a partially sectional side elevation showing a sliding table of FIG. 23.
Figure 25:
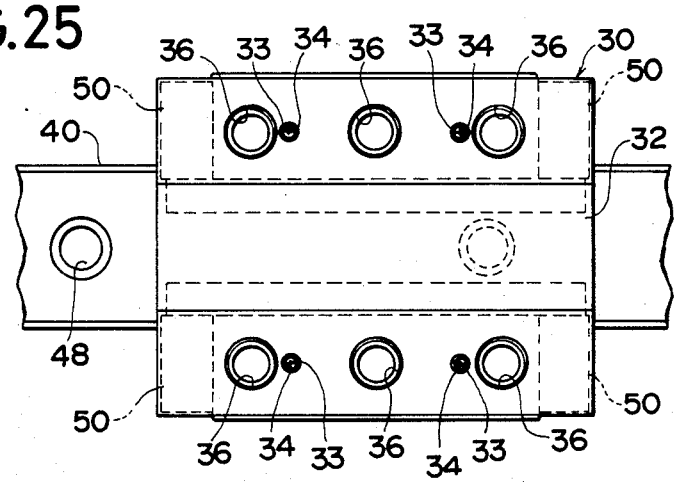
FIG. 25 is a top plan view of FIG. 23.
Figure 26:
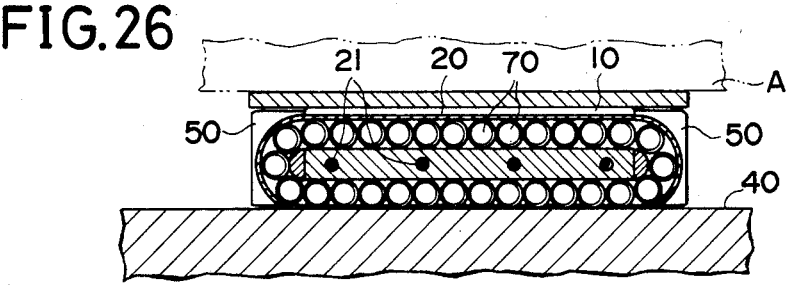
FIG. 26 is a section taken along line XXVI—XXVI of FIG. 23.
Figure 27:
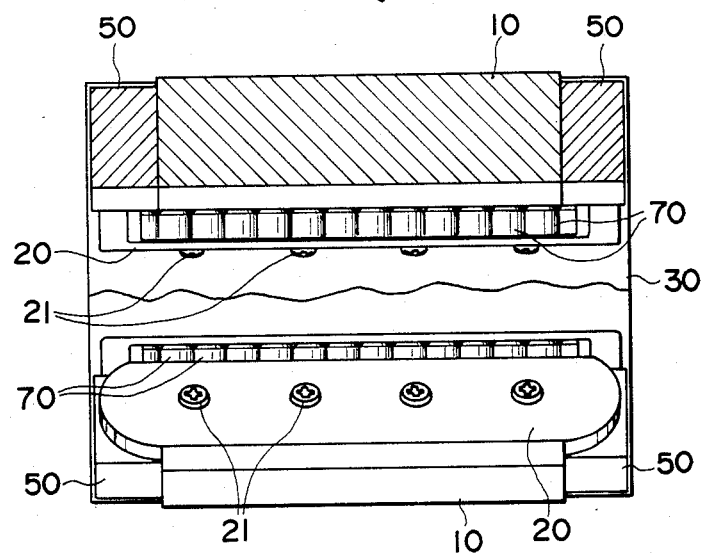
FIG. 27 is a partially sectional bottom view showing the sliding table of the second embodiment.
Figure 28:
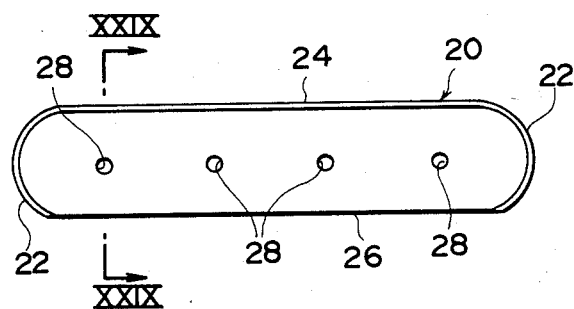
FIG. 28 is a top plan view showing a roller guide of the second embodiment.
Figure 29:
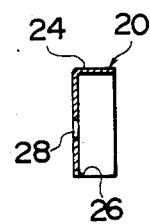
FIG. 29 is a section taken along line XXIX—XXIX of FIG. 28.
Figure 30:
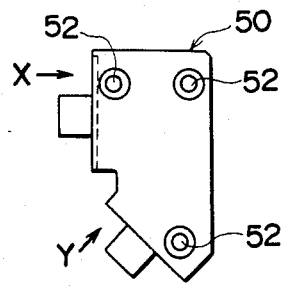
FIG. 30 is a front elevation showing a cover in the second embodiment.
Figure 31:
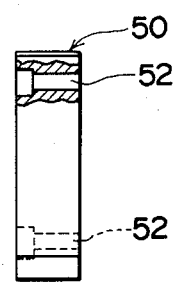
FIG. 31 is a partially sectional side elevation of FIG. 30.
Figure 32:
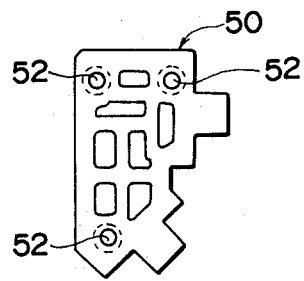
FIG. 32 is a back elevation of FIG. 30.
Figure 33:
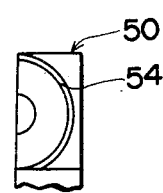
FIG. 33 is a view taken in the direction of arrow X or Y of FIG. 30.
Figure 34:
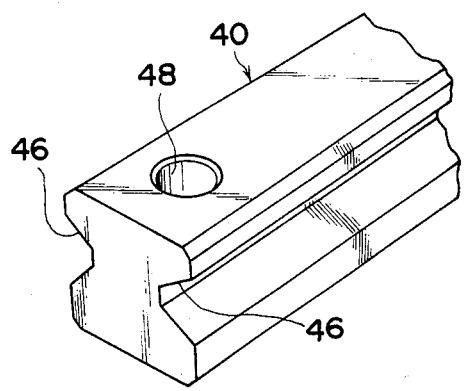
FIG. 34 is a perspective view showing a rail according to the second embodiment.

In this second embodiment, furthermore, the carriage A is formed, as shown in FIG. 22, with through holes 15b, through which are inserted the fastening bolts 13 for attaching the aforementioned respective sliding table halves 10, so that the fastening bolts 13 can be fastened from above that carriage A to facilitate more the attachment of the respective sliding table halves 10 to the carriage A.

Incidentally, in the respective Drawings of the second embodiment, the same parts as those of the foregoing first embodiment are indicated at the same reference numerals.

What is claimed is:

1. A straight sliding roller bearing comprising: a pair of sliding table halves each including an upper load bearing portion and an lower load bearing portion and formed in an inner side of a leading end of each of said load bearing portions with loaded grooves, which have rolling faces forming loaded areas of endless roller races along their axial directions, and in an outer side of the same with unloaded portions, which form endless roller races along their axial directions in a manner to correspond to said loaded grooves, such that at least one of said rolling faces is so inclined as to bear transverse load; a roof mounted over the upper faces of said sliding table halves, which are opposed at a predetermined spacing to each other, and made elastically deformable between said paired sliding table halves; two pairs of roller guides attached respectively to the leading ends of the respective load bearing portions of said respective sliding table halves and associated either with said loaded grooves or with said loaded grooves and said unloaded portions to form said endless roller races; rails having their upper portions fitted at a predetermined spacing from each other in recesses formed by said sliding table halves and said roof, and having rolling faces facing the rolling faces of said loaded grooves which are formed in the load bearing portions of said respective sliding table halves; and a multiplicity of rollers made rollable on the respective endless roller races, which are formed respectively on the loaded portions of said respective sliding table halves, for bearing loads between the rolling faces at the sides of said sliding table halves and the rolling faces at the sides of said rails, whereby, in a pre-pressure adjusting when said roller bearing is to be attached to a carriage made movable along said rails, a gap between said sliding table halves and said rails can be adjusted by applying a transverse load to one of said sliding table halves to elastically deform said roof.

2. A straight sliding roller bearing as set forth in claim 1, wherein each of said sliding table halves has a sloped upper portion and a sloped lower portion, which intersect each other on an extension extending from one side of a horizontal mounting portion, and formed in the lower side of the leading end of said sloped upper portion and in the inner side of the lower end of said sloped lower portion, respectively, with the loaded grooves, which have rolling faces having a sloping angle of 45 degrees and forming the loaded regions of said endless roller races along their axial directions, and on the upper side of the leading end of said sloped upper portion and on the outer side of the lower end of said sloped lower portion, respectively, with the unloaded portions which form said endless roller races along their axial directions in a manner to correspond to said loaded grooves.

3. A straight sliding roller bearing as set forth in claim 1, wherein each of said sliding table halves is formed to have a generally L-shaped section having a horizontal portion and a depending portion, which depends from one end of said horizontal portion, and formed in the lower side of the leading end of said horizontal portion with the loaded groove, which have a horizontal rolling face forming the loaded region of the corresponding one of said endless roller races along its axial direction, in the inner side of the lower end of said depending portion with the loaded groove having a sloping angle of 45 degrees and forming the loaded region of the corresponding one of said endless roller races along its axis, and on the upper side of the leading end of said horizontal portion and the outer side of the lower end of said depending portion, respectively, with the unloaded portions which form said endless roller races along their axial directions in a manner to correspond to said loaded grooves.

4. A straight sliding roller bearing as set forth in any of the claims 1 to 3, wherein said roof is formed generally at its central portion with a thinned portion for allowing its elastic deformation.

5. A straight sliding roller bearing as set forth in any of the claims 1 to 3, wherein said roof is formed generally at its central portion with a bent portion for allowing its elastic deformation.

6. A straight sliding roller bearing as set forth in claim 5, wherein the rolling faces formed on said sliding table halves and said rails, respectively, are made flat, and wherein said rollers rolling on said endless roller races are made of cylindrical rollers.

7. A straight sliding roller bearing as set forth in claim 5, wherein the rolling faces formed on said sliding table halves and said rails, respectively, are made arcuate, and wherein said rollers rolling on said endless roller races are made of spherical rollers.

* * * * *